United States Patent [19]
Quick

[11] Patent Number: 5,197,755
[45] Date of Patent: Mar. 30, 1993

[54] INDEPENDENT WHEEL SUSPENSION SYSTEM FOR VEHICLES

[76] Inventor: Dallas W. Quick, 108 Buckboard Trail, Flagstaff, Ariz. 86004

[21] Appl. No.: 833,365

[22] Filed: Feb. 10, 1992

[51] Int. Cl.⁵ .............................................. B60G 3/00
[52] U.S. Cl. ................................... 280/690; 280/701; 280/666; 280/696; 267/254
[58] Field of Search ............... 280/701, 666, 667, 675, 280/696, 690, 698, 691; 267/248, 254

[56] References Cited

U.S. PATENT DOCUMENTS

| | | | |
|---|---|---|---|
| 2,836,413 | 5/1958 | Hirst | 267/254 X |
| 4,159,128 | 6/1979 | Blaine | 280/666 X |
| 4,662,467 | 5/1987 | Arai et al. | 280/666 X |

FOREIGN PATENT DOCUMENTS

| | | | |
|---|---|---|---|
| 348214 | 12/1989 | European Pat. Off. | 280/691 |
| 745153 | 5/1943 | Fed. Rep. of Germany | 280/699 |
| 2227143 | 11/1974 | France | 280/701 |
| 666852 | 2/1952 | United Kingdom | 267/254 |

OTHER PUBLICATIONS

Holmes, Howdy. "Suspension." In Formula Car Technology, pp. 18-19. Steve Smith Autosports Publications, 1980.

Smith, Steve. "Wheel Rate." In Advanced Race Car Suspension Development, pp. 65-70. Steven Smith Autosports Publications, 1974.

Primary Examiner—Johnny D. Cherry
Assistant Examiner—Gary C. Hoge
Attorney, Agent, or Firm—Wayne D. House

[57] ABSTRACT

A coil spring suspension system that differs from conventional prior art coil spring suspensions in that an additional A-arm is used, the additional A-arm being vertically oriented and having its leg ends attached to the leg ends of the horizontally oriented upper A-arm. The vertically oriented A-arm has its leg ends pivotally attached to the vehicle frame or body with the leg ends of the upper horizontally oriented A-arm. The apex of the vertically oriented A-arm lies in or near the plane of the lower horizontally oriented A-arm. A coil spring is used, having a substantially horizontally oriented longitudinal axis, with one end of the coil spring secured to the horizontally oriented lower A-arm near the apex of the horizontally oriented lower A-arm and with the other end of the coil spring attached to or near to the apex of the vertically oriented A-arm.

6 Claims, 9 Drawing Sheets

FIG.1

*Prior Art*

FIG. 2

*Prior Art*

FIG. 3

*Prior Art*

INDEPENDENT WHEEL SUSPENSION SYSTEM FOR VEHICLES

FIELD OF THE INVENTION

The present invention relates to an independent wheel suspension system for vehicles.

BACKGROUND OF THE INVENTION

Independent wheel suspension systems for vehicles are well known. They represent the preferred method of suspending a wheel from a vehicle frame or body because any deflection of that wheel caused by encountering an irregularity in the roadway surface does not affect the wheel on the opposite side of the vehicle. Independent wheel suspension systems typically use coil springs, leaf springs or torsion bars to transfer the weight of a corner of the vehicle to the road wheel. The use of coil springs is predominant, with millions of vehicles having been manufactured using coil spring supported independent suspension systems on at least one end of a vehicle. As will be further described, such a system transfers the vehicle weight of a corner of the vehicle downward through a vertically-oriented coil spring to a lower A-arm that has the apex of the A-arm attached to a wheel and has its opposite leg ends pivotally attached to the vehicle frame or body.

SUMMARY OF THE INVENTION

The independent wheel suspension system of the present invention comprises an upper A-arm and a lower A-arm, the upper A-arm and lower A-arms being horizontally oriented and approximately parallel to and aligned with each other. The apex of the upper A-arm is swivelably attached to the upper end of an upright member with the apex of the lower A-arm being swivelably attached to the lower end of the upright member. A horizontally oriented wheel spindle is attached to one side of the upright, between the upper and lower ends of the upright and opposite the A-arms. The opposite leg ends of the upper and lower A-arms, that is the ends of the A-arms opposite the apex, are pivotally attached to the vehicle frame or body, with the opposite leg ends of the upper A-arm being pivotally attached to the vehicle frame or body above the pivotally attached opposite leg ends of the lower A-arms. The inventive suspension system differs from conventional suspensions in that an additional A-arm is used, the additional A-arm being vertically oriented and having its leg ends rigidly attached to the leg ends of the upper A-arm. Thus the vertically oriented A-arm has its opposite leg ends pivotally attached to the vehicle frame or body with the opposite leg ends of the upper A-arm. The apex of the vertically oriented A-arm lies in or near the plane of the lower A-arm. A coil spring is used, having a horizontally oriented longitudinal axis, with one end of the coil spring secured to the lower A-arm near the apex of the lower A-arm and with the other end of the coil spring attached to or near to the apex of the vertically oriented A-arm.

In comparison to conventional independent coil spring systems, the independent wheel suspension system of the present invention allows the use of a weaker spring to support the weight of the vehicle corner if the vertical A-arm is of adequate length. A weaker spring is correspondingly lighter and allows for a reduction in unsprung weight. Further, the inventive system may allow a lower center of gravity because of the revised spring location. The location of the coil spring easily allows a drive shaft to run between the upper and lower A-arms to power a driven wheel. As the components of the inventive suspension system do not interfere with steering components, the inventive suspension system can also be used for the front suspension of front wheel drive vehicles.

DETAILED DESCRIPTION OF THE INVENTION

Figure 1:
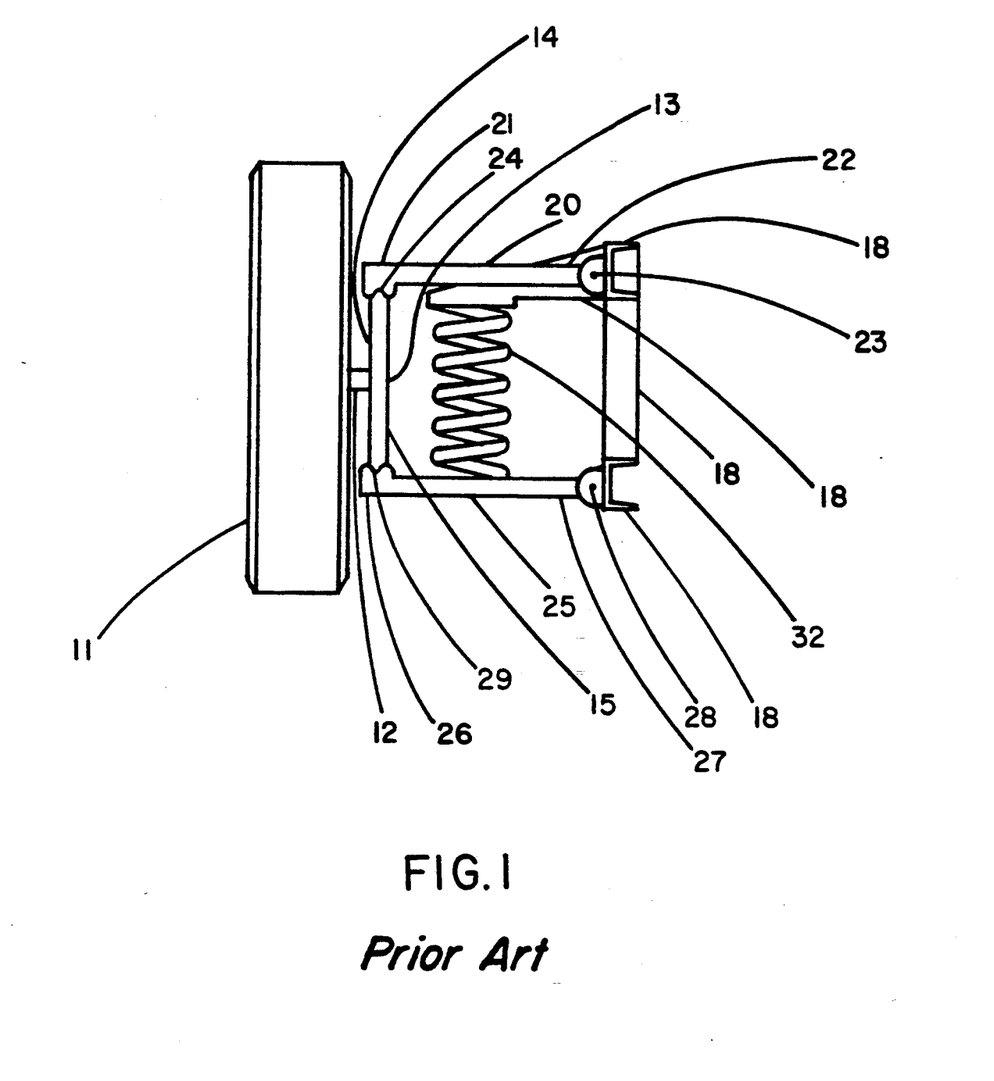
FIG. 1 shows an end view of a conventional prior art coil spring independent suspension system as viewed from one end of the vehicle.
Figure 2:
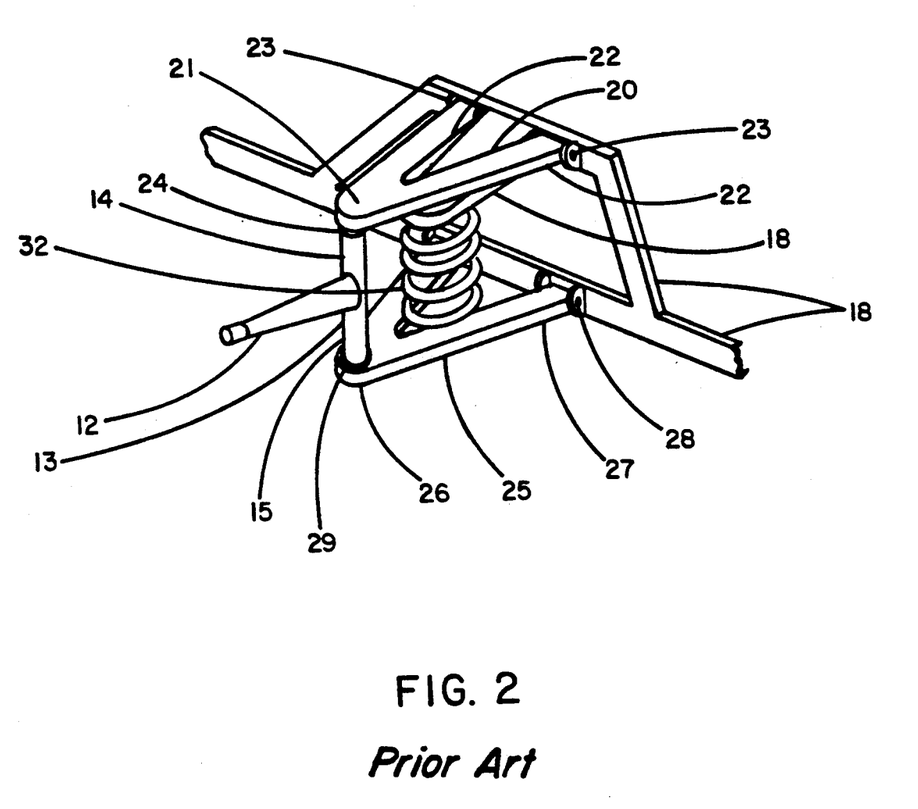
FIG. 2 shows a perspective view of the conventional prior art coil spring independent suspension system shown by FIG. 1.

FIG. 1 shows a schematic end view of a conventional prior art coil spring independent suspension system. FIG. 2 shows a perspective view of the same system as shown by FIG. 1 except that the wheel and tire have been removed for clarity.

The conventional suspension system comprises a horizontally oriented upper A-arm 20 having an apex 21 at one end and two leg ends 22 opposite the apex 21. The horizontally oriented lower A-arm 25 also has an apex 26 and two opposite leg ends 27: it is located directly below and approximately aligned with the horizontally oriented upper A-arm 20. By approximately aligned with is meant that the apex 26 of the lower A-arm 25 is below the apex 21 of the upper A-arm 20 and the opposite leg ends 27 of the lower A-arm 25 are below the opposite leg ends of the upper A-arm. The upper and lower A-arms may be of different dimensions; typically, the lower A-arm 25 is of greater length from apex to opposite leg ends than the upper A-arm 20. The A-arms may be made from one, two or more separate parts; they are typically made from steel or aluminum and may be stamped, cast, forged or fabricated from separate pieces. The apex 21 of the upper A-arm 20 is swivelably attached to the upper end 14 of an upright 13, the apex 26 of the lower A-arm 25 being swivelably attached to the lower end 15 of the upright 13. The swivelable attachments are generally accomplished with the use of ball-joints, 24 and 29. The wheel spindle 12 is attached to the upright 13 opposite the A-arms 20 and 25. The opposite leg ends 22 of the upper A-arm 20 are pivotally attached to the vehicle frame 18 at the upper A-arm pivots 23: the leg ends 27 of the lower A-arm 25 are pivotally attached to the vehicle frame 18 at the lower A-arm pivots 28. The longitudinal axis of the coil spring 32 is vertically oriented with the lower end of the coil spring 32 attached to the lower A-arm 25 between apex 26 and opposite leg ends 27. The upper end of the vertically oriented coil spring 32 is attached to the vehicle frame 18, the weight of the vehicle transmitted through compression of the coil spring 32 against the lower A-arm 25 to the wheel 11.

Figure 3:
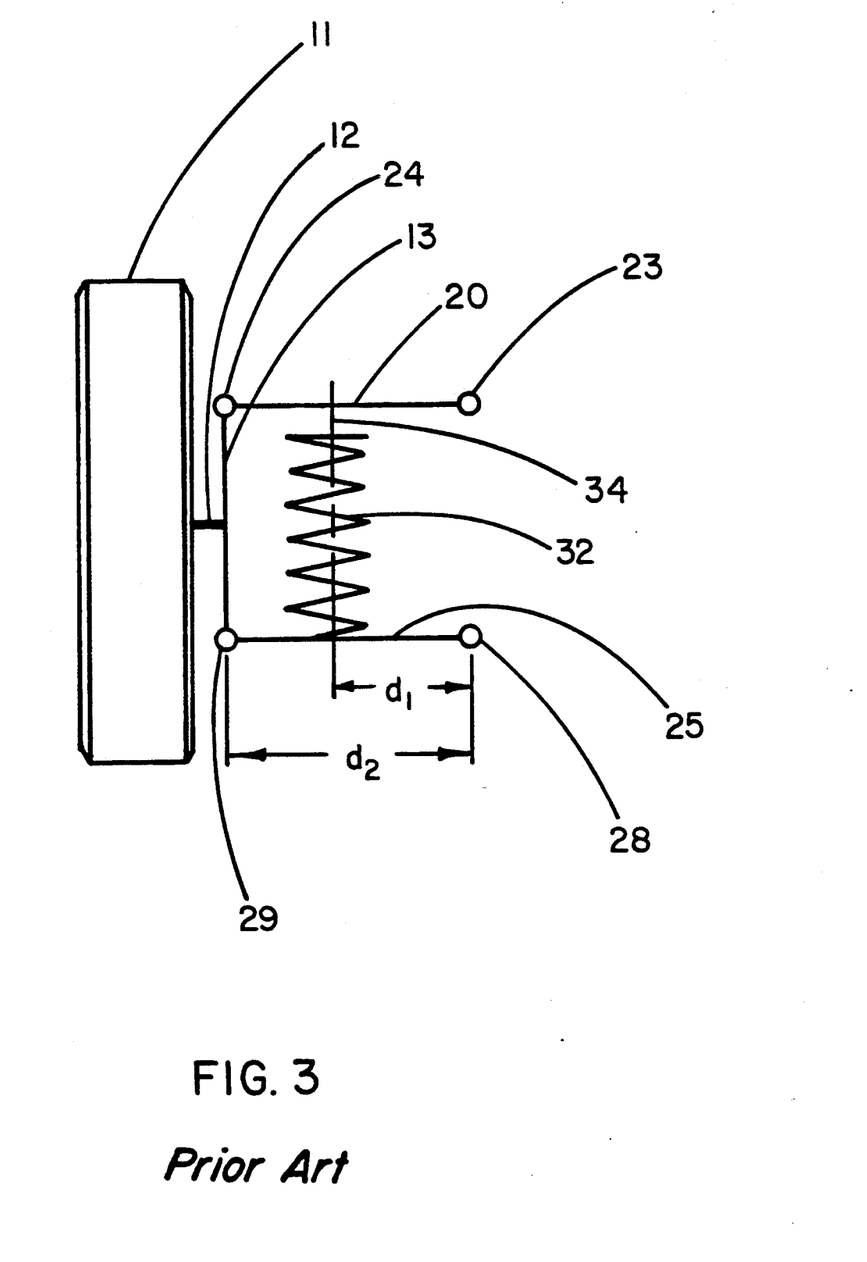
FIG. 3 shows a schematic end view of a conventional prior art coil spring independent suspension system indicating dimensions $d_1$ and $d_2$ required to calculate the system motion ratio.

The motion ratio for a suspension system is defined as the ratio of spring travel to wheel travel. For the conventional coil spring suspension system shown, the motion ratio as shown by FIG. 3 is the ratio of the distance $d_1$ from the point where the longitudinal axis 34 of the coil spring 32 intersects the lower A-arm 25 to the straight line through the two lower A-arm pivots 28 and distance $d_2$ between lower ball joint 29 and the straight line through the lower A-arm pivots 28. The wheel rate is equal to the spring rate of the coil spring multiplied by the square of the motion ratio. Thus for a suspension having a motion ratio of 0.5, a spring having a spring rate of 1000 lb/inch would be required to provide a wheel rate of 250 lb/inch.

Figure 4:
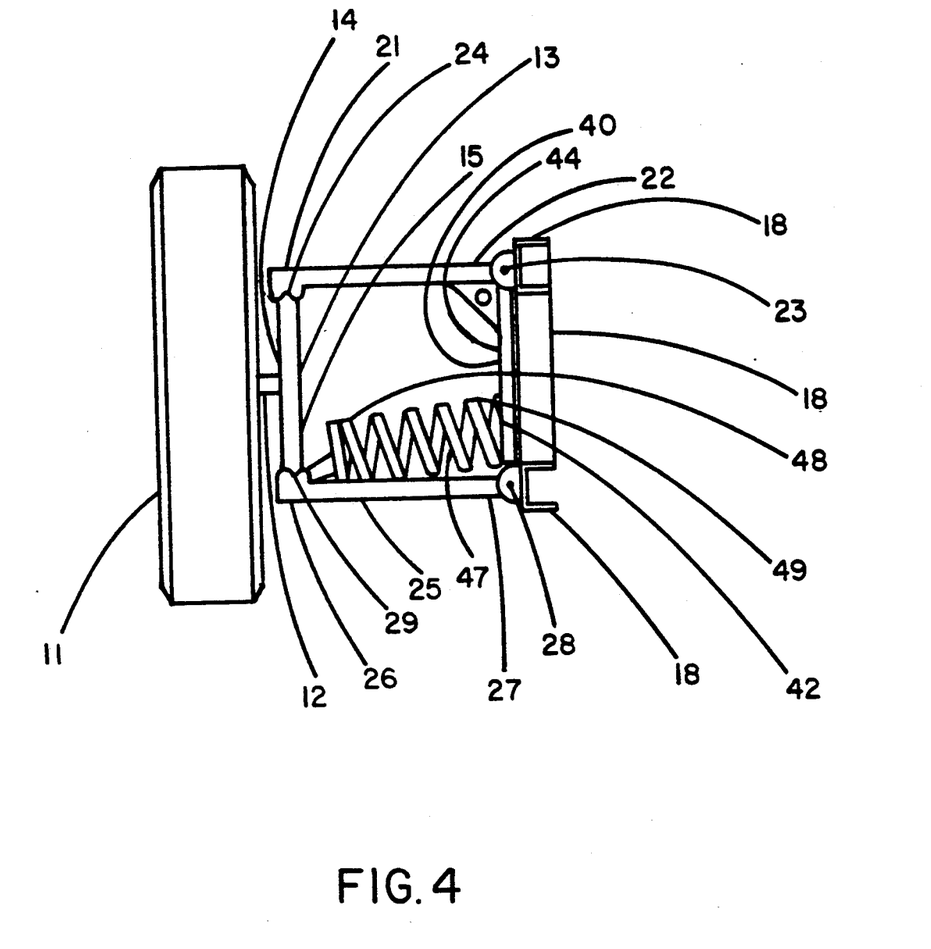
FIG. 4 shows an end view of the independent suspension system of the present invention.
Figure 5:
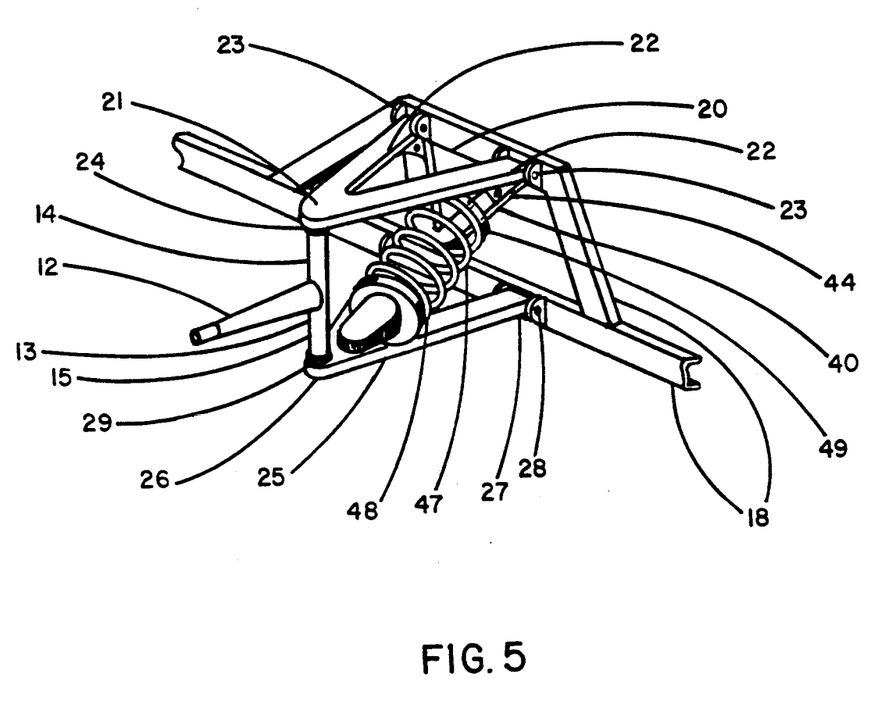
FIG. 5 shows a perspective view of the independent suspension system of the present invention shown by FIG. 4.
Figure 6:
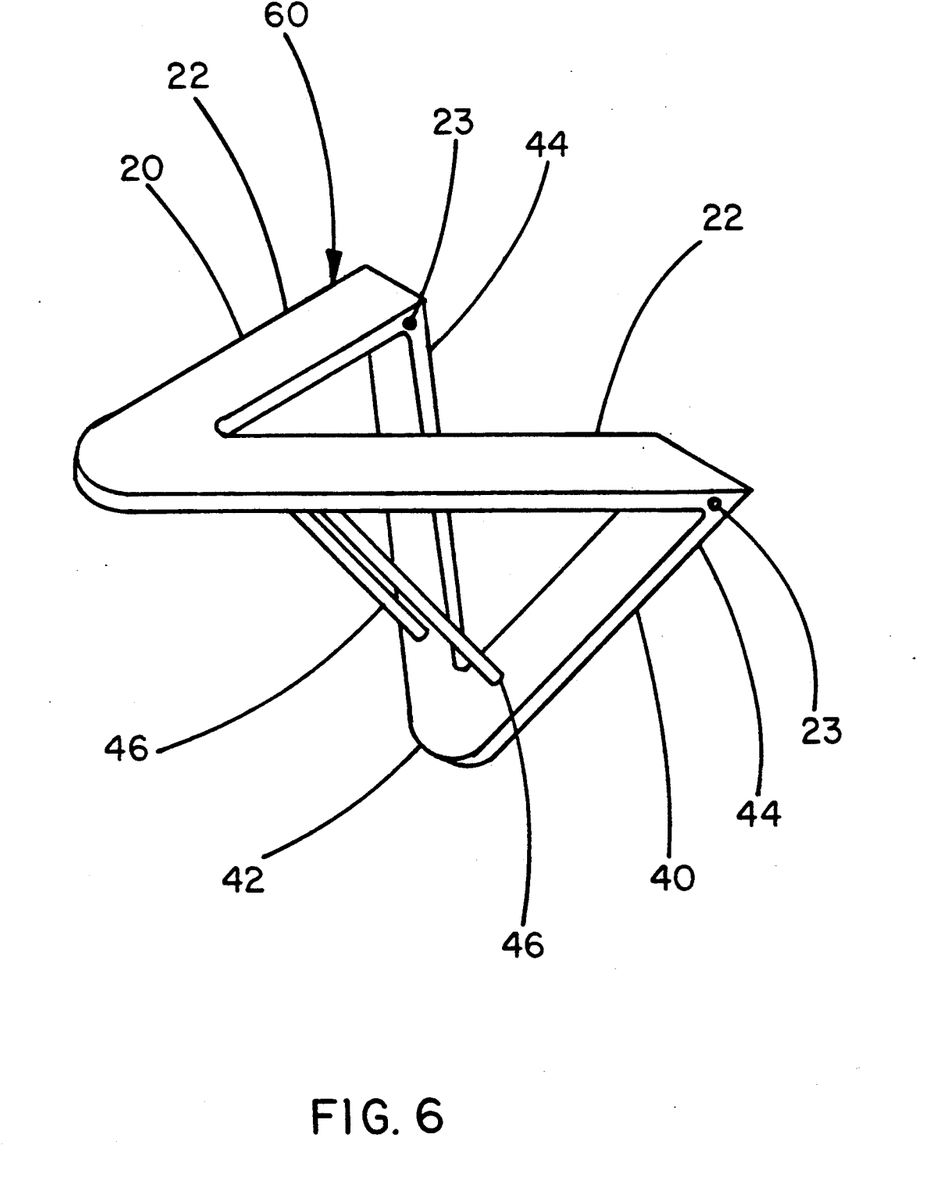
FIG. 6 shows a perspective view of the horizontally oriented upper A-arm and vertically oriented A-arm assembly having optional interconnecting braces.

The independent wheel suspension system of the present invention is shown by the end view of FIG. 4 and the perspective view of FIG. 5. A vertically oriented A-arm 40 has its leg ends 44 rigidly attached to the leg ends 22 of the horizontally oriented upper A-arm 20. The vertically oriented A-arm 40 thus pivots about the upper A-arm pivots 23 with the horizontally oriented upper A-arm 20. The assembly 60 of the horizontally oriented upper A-arm 20 and the vertically oriented A-arm 40 thus functions in the fashion of a rocker arm with both A-arms pivoting together about pivots 23. This assembly 60 is shown separately in the perspective view of FIG. 6. The angle between the horizontal upper A-arm 20 and the vertically oriented A-arm 40 is approximately 90 degrees. Optional interconnecting braces 46 are attached between the horizontal upper A-arm 20 and the vertically oriented A-arm 40. Alternatively a triangular web may be used in place of an interconnecting brace 46. A horizontally oriented coil spring 47 having a substantially horizontally oriented longitudinal axis is located in or near the plane of the horizontally oriented lower A-arm 25 with the first end 48 of the horizontally oriented coil spring 47 attached to or near the apex 26 of the horizontal lower A-arm 25. The second end 49 of the horizontally oriented coil spring 47 is attached to the apex 42 of the vertically oriented A-arm 40.

As the weight of the vehicle is placed onto the wheel 11 causing the wheel 11 to raise relative to the vehicle frame 18. the upright 13 lifts the apex 21 of the horizontally oriented upper A-arm 20, the leg ends 22 pivoting about their pivot 23. The vertically oriented A-arm 40 also pivots about pivot 23, the apex 42 of the vertically oriented A-arm causing compression of the horizontally oriented coil spring 47. The weight of the vehicle is carried on pivots 23 while compressing the horizontally oriented coil spring 47.

Figure 7A:
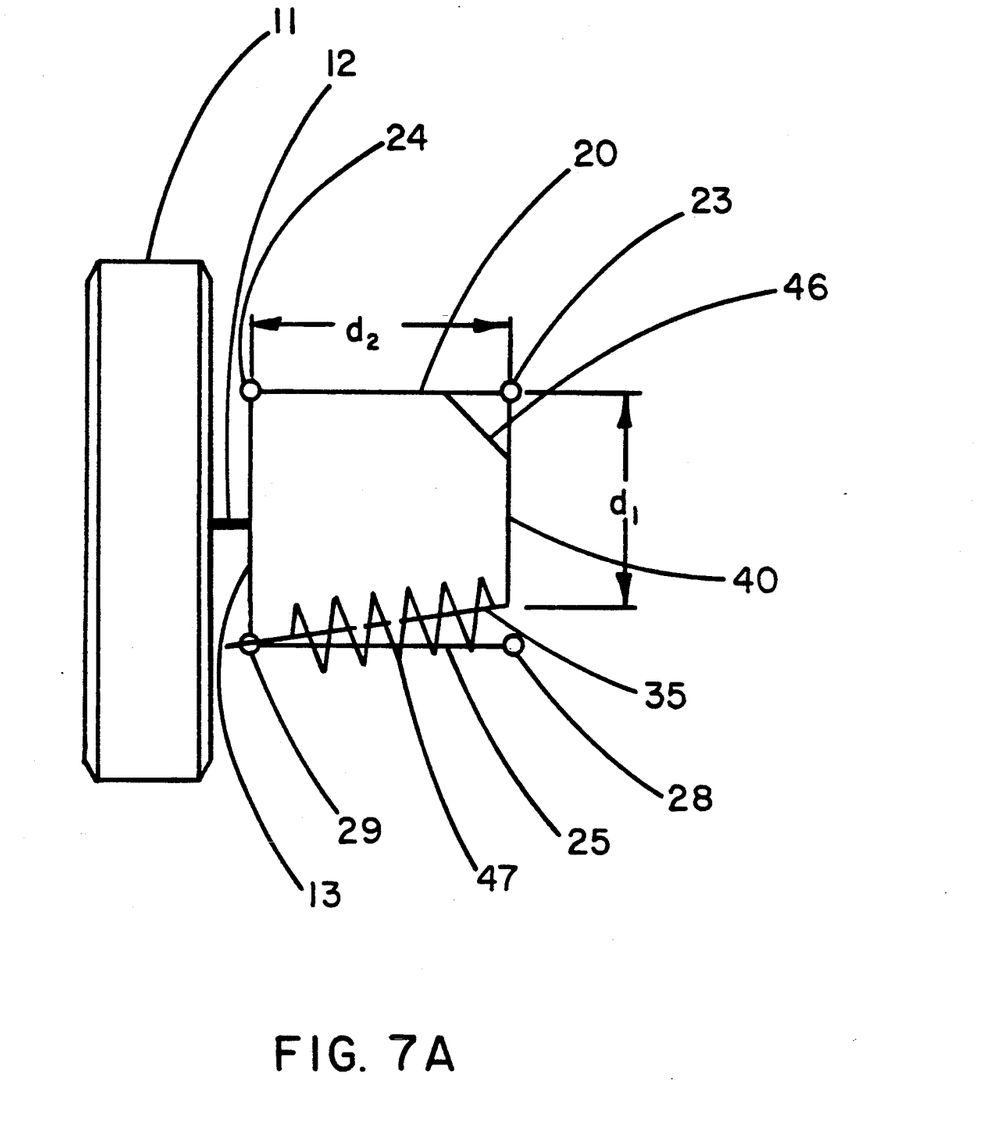
FIG. 7A shows a simplified schematic end view of the inventive suspension with only the static weight of the vehicle corner applied.
Figure 7B:
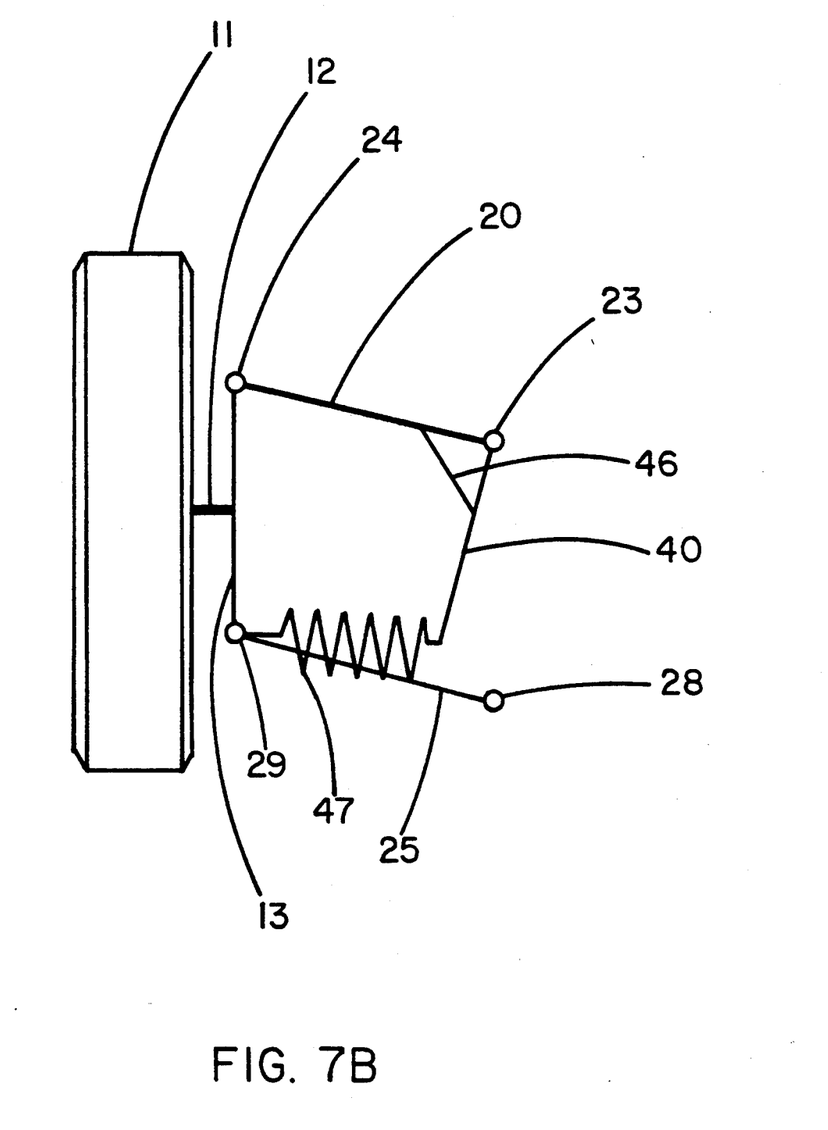
FIG. 7B shows a simplified schematic end view of the inventive suspension with the wheel deflected upward from its normal static loaded position.
Figure 7C:
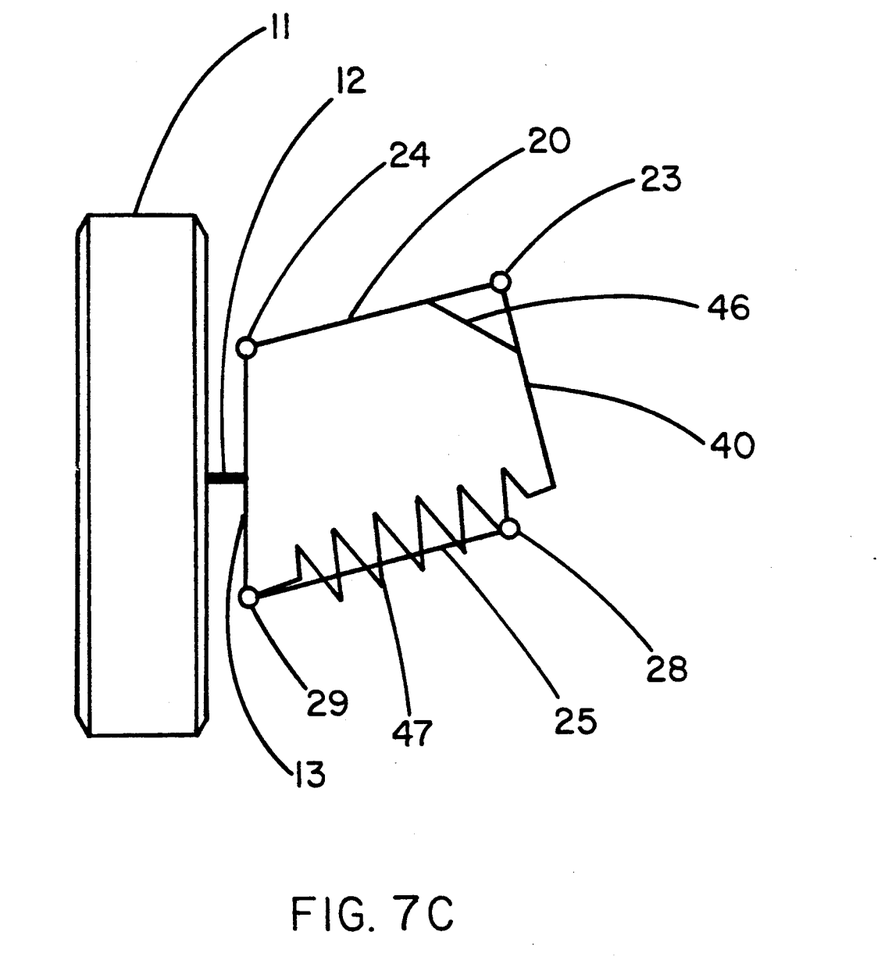
FIG. 7C shows a simplified schematic end view of the inventive suspension with the wheel deflected downward from its normal static loaded position.

FIGS. 7A, 7B and 7C show simplified schematic end views of the inventive suspension. FIG. 7A shows the inventive suspension with only the weight of the vehicle corner applied, that is, in a static, normal condition as it would appear with the vehicle parked on a flat, level surface. Horizontally oriented coil spring 47, with its substantially horizontally oriented longitudinal axis 35, is at an angle of 45 degrees or less with respect to the horizontal in the normal condition. FIG. 7B shows the inventive suspension with the wheel 11 deflected upwards and with the horizontally oriented coil spring 47 compressed beyond the amount of compression it would experience in the normal condition. FIG. 7C shows the inventive suspension with the wheel 11 deflected downwards and with the horizontally oriented coil spring 47 compressed less than the amount it would be in the normal condition. The relatively great amount of spring travel is apparent. This is made possible by the use of a vertically oriented A-arm 40 that is approximately the same length as the horizontally oriented upper A-arm 20. For the example shown, the amount of spring travel between the two extreme deflection positions shown in FIGS. 7B and 7C is approximately equal to the amount of wheel travel. This means that the motion ratio is equal to, for this example, approximately 1.0 and that a weaker and correspondingly lighter spring can be used to support that corner of the vehicle in comparison to a conventional prior art coil spring suspension. As shown by FIG. 7A, the motion ratio can be calculated as distance $d_1$, the length of the vertically oriented A-arm 40. divided by distance $d_2$, the length of the horizontal upper A-arm 20. The length of the horizontal upper A-arm 20 is taken from the center of the upper ball-joint 24 to the axis of the upper A-arm pivots 23: the length of the vertically oriented A-arm 40 is taken from the intersection of the substantially horizontally oriented longitudinal axis 35 of coil spring 47 with the vertically oriented A-arm 40 to the axis of the upper A-arm pivots 23.

The attachment of the second end 49 of the horizontally oriented coil spring 47 to the apex 42 of the vertically oriented A-arm 40, may optionally be provided with several different attachment points effectively allowing dimension $d_1$ to be lengthened or shortened and consequently allowing the motion ratio to be modified for different situations. The ability to vary motion ratio may be desirable, for example, for use with race cars on different types of tracks.

A shock absorber may be mounted in any conventional position between either the horizontal upper A-arm 20 or the horizontal lower A-arm 25 and the vehicle frame 18. The inventive suspension will also allow the shock absorber to be mounted with its longitudinal axis along the longitudinal axis 35 of the horizontally oriented coil spring 47. The mounting points of the shock absorber ends would then be the same as or near to the mounting points for the ends of the horizontally oriented coil spring 47. This is believed to be the preferred shock absorber location.

A conventional anti-sway bar may be attached to the inventive suspension and to the vehicle frame in a conventional manner. The inventive suspension system may be used to support a rear wheel, a front wheel, a steerable wheel, a driven wheel, or a steerably driven wheel.

I claim:

1. An independent wheel suspension system for a vehicle comprising:
   a) an upper A-arm comprising a pair of legs attached together at one end of each leg to form an apex with the opposite leg ends spaced apart, the upper A-arm lying in an approximately horizontal plane; and
b) a lower A-arm comprising a pair of legs attached together at one end of each leg to form an apex with the opposite leg ends spaced apart, the upper A-arm lying in an approximately horizontal plane and lying below and aligned with the upper A-arm; and
c) a vertically oriented upright member having an upper end and a lower end, the upper end being swivelably attached to the apex of the upper A-arm and the lower end being swivelably attached to the apex of the lower A-arm; and
d) a horizontally oriented wheel spindle attached to the vertically oriented upright; and
e) the opposite leg ends of the upper A-arm being pivotally attached to a vehicle frame and the opposite leg ends of the lower A-arm being pivotally attached to the vehicle frame below the opposite leg ends of the upper A-arm; and
f) a vertically oriented A-arm comprising a pair of legs attached together at one end of each leg to form an apex with the opposite leg ends spaced apart, the vertically oriented A-arm lying in an approximately vertically oriented plane, the opposite leg ends of the vertically oriented A-arm being attached to the opposite leg ends of the upper A-arm so that the opposite leg ends of the vertically oriented A-arms are pivotally attached to the vehicle frame and rigidly attached to the opposite leg ends of the upper A-arm, and further having the apex of the vertically oriented A-arm lying in or near the approximately horizontal plane of the lower A-arm; and
g) a coil spring having a substantially horizontally oriented longitudinal axis and having a first end and a second end, the first end being attached to the lower A-arm near the apex of the lower A-arm and the second end being attached to the vertically oriented A-arm at or near the apex of the vertically oriented A-arm.

2. An independent wheel suspension system for a vehicle according to claim 1 that supports a front wheel of the vehicle.

3. An independent wheel suspension system for a vehicle according to claim 1 that supports a rear wheel of the vehicle.

4. An independent wheel suspension system for a vehicle according to claim 1 that supports a steerable wheel of the vehicle.

5. An independent wheel suspension system for a vehicle according to claim 1 that supports a driven wheel of the vehicle.

6. An independent wheel suspension system for a vehicle according to claim 1 that supports a steerable driven wheel of the vehicle.

* * * * *